United States Patent
Hara et al.

(10) Patent No.: US 6,792,014 B2
(45) Date of Patent: Sep. 14, 2004

(54) ORTHOGONAL EXCITATION-TYPE LASER OSCILLATOR

(75) Inventors: Shoichiro Hara, Tokyo (JP); Koji Funaoka, Tokyo (JP); Takao Ohara, Tokyo (JP); Satoshi Nishida, Tokyo (JP)

(73) Assignee: Mitsubishi Denki Kabushiki Kaisha, Chiyoda-Ku (JP)

(*) Notice: Subject to any disclaimer, the term of this patent is extended or adjusted under 35 U.S.C. 154(b) by 0 days.

(21) Appl. No.: 10/272,916

(22) Filed: Oct. 18, 2002

(65) Prior Publication Data

US 2003/0202553 A1 Oct. 30, 2003

(30) Foreign Application Priority Data

Apr. 24, 2002 (JP) ........................................ 2002-122990

(51) Int. Cl.[7] ................................................ H01S 3/10
(52) U.S. Cl. ............................... 372/33; 372/9; 372/26
(58) Field of Search ............................... 372/9, 20, 33, 372/26

(56) References Cited

U.S. PATENT DOCUMENTS 5,745,513 A * 4/1998 Nishida et al. ............... 372/34

FOREIGN PATENT DOCUMENTS

| JP | S61-199685 | 9/1986 | |
| JP | S63-50083 | 3/1988 | |
| JP | S63-98160 | 4/1988 | |
| JP | 5-206544 | 8/1993 | |
| JP | 05-206544 | * 8/1993 | ............ H01S/3/08 |
| JP | H7-111352 | 4/1995 | |
| JP | 2000-183425 | * 12/1998 | ............ H01S/3/02 |
| JP | 2000-183425 | 6/2000 | |

* cited by examiner

Primary Examiner—Tan Ho
Assistant Examiner—Leith Al-Nazer
(74) Attorney, Agent, or Firm—Burns, Doane, Swecker & Mathis, L.L.P.

(57) ABSTRACT

One optical base is provided on each side of a housing that houses a laser oscillator. Optical parts of an optical resonator are fixed to the optical bases. The optical bases are fixed to each other, independently from the housing, by supporting rods. A plate spring and two dampers fix the respective optical base to respective end of the housing. The plate spring bends in the direction of the laser beam when the housing deforms. The damper attenuates oscillation generated due to the displacement of the housing.

6 Claims, 11 Drawing Sheets

ORTHOGONAL EXCITATION-TYPE LASER OSCILLATOR

BACKGROUND OF THE INVENTION

1) Field of the Invention

The present invention relates to an orthogonal excitation-type laser oscillator which outputs a laser beams having stable output or stable beam mode.

2) Description of the Related Art

A gas laser oscillator generally includes a discharge tube and an optical resonator. Gas ("laser gas") is filled is the discharge tube. The optical resonator has two mirrors. One mirror is arranged on one side of the discharge tube. The gas laser oscillator excites a laser by means of discharge in the laser gas. Large amount of heat is generated in the discharge tube at the time of laser oscillation. A part of this heat is transmitted to the optical resonator and a base plate which supports the discharge tube and the optical resonator. The optical resonator and the base plate get deformed because of this heat. As a result, an error of the parallelism of a pair of optical bases composing the optical resonator, displacement between an axis of the optical resonator and an axis of the oscillator housing and the like occur. Moreover, as for the optical resonator itself, a thermal expansion difference is generated between components such as a frame bar member and an end surface plate member due to a change in the outer temperature, and thus there is a fear that displacement of the optical resonator or the like occurs due to the thermal expansion difference. The displacement of the optical resonator causes an error of mirror alignment, and this makes the laser output and the beam mode of a laser beam unstable. Therefore, in order to cope with the displacement of the optical resonator and the like due to an influence of heat, laser oscillators having various structures are suggested.

FIG. 9 shows a perspective view of a conventional orthogonal excitation-type laser oscillator that has been disclosed in the Japanese Patent Application Laid-Open No. 2000-183425. In this oscillator, a front optical base 9 and a rear optical base 7 are provided on the sides of an oscillator housing 1. A partial reflection mirror is fixed to the front optical base 9 and a total reflection mirror is fixed to the rear optical base 7. The front optical base 9 and the rear optical base 7 are connected firmly by one lower supporting bar and two upper supporting bars totaling to three supporting bars 112 through 114 extending to a laser beam advancing direction (optic axis direction) so that the partial reflection mirror and the total reflection mirror are fixed parallel with each other on the same optical axis. An optical resonator is constituted in such a manner.

Axially center portions of the supporting bars 113 and 114 on the upper side of the oscillator housing 1 are connected to a center portion of the optic axis direction on an upper surface of the oscillator housing 1 by brackets 120 and 121, respectively. The connection of the supporting bar 113 positioned on a blower side where thermal deformation is less to the oscillator housing 1 by means of the bracket 120 is a completely fixing connection, and the connection of the supporting bar 114 positioned on a high-temperature side to the oscillator housing 1 by means of the bracket 121 is a movable connection by a slide base 122 of which movements in the axial and heightwise directions are restricted. Namely, the bracket 121 can slide on the slide base 122 to the right-left direction as shown by an arrow. Connection of the lower supporting bar 112 is not made by the oscillator housing 1 and the bracket, but both ends of the supporting bar 112 are simply fixed to the optical bases 9 and 7. Laser beam passing sections between the oscillator housing 1 and the rear optical base 7 and between the oscillator housing 1 and the front optical base 9 are connected by bellows, respectively.

In the conventional oscillator, although a change in the positional relationship between the two optical bases 7 and 9 due to a temperature distribution of a laser medium gas can be suppressed by the supporting structure using the three supporting bars 112 through 114 and the brackets 120 and 121, countermeasures are not taken against the instance where the laser oscillator is installed in a place where the vibration-proof measurement is not sufficient. Namely, in the orthogonal excitation-type laser oscillator shown in the prior art, an external force is applied to the optical resonator by external oscillation, and a structure of the optical resonator is elastically deformed, and this causes an error of the mirror alignment.

Deformation of the orthogonal excitation-type laser oscillator due to oscillation from the outside will be explained with reference to FIGS. 9 through 11 exemplifying the instance where the orthogonal excitation-type laser oscillator shown in FIG. 9 is installed on an XY stage which has a function of locating a processing apparatus. FIGS. 10 and 11 show a state that the external force is applied to the optical resonator composing the orthogonal excitation-type laser oscillator. FIG. 10 shows the external force to be applied to the optical resonator, and FIG. 11 shows the state of a deformation of the optical resonator due to these external forces.

The orthogonal excitation-type laser oscillator is fixed onto the XY stage, not shown, by a leg 131 provided to a lower portion of the oscillator housing 1. As for the optical resonator, the supporting bars 113 and 114 on the upper portion of the optical resonator are connected at the upper portion of the oscillator housing 1 by the brackets 120 and 121, but the optical resonator is not connected onto the XY stage. Namely, the optical resonator is hung from the oscillator housing 1. Therefore, when the oscillator housing 1 receives an acceleration G to a laser emission direction due to a movement of the XY stage, since the connected positions between the optical resonator and the oscillator housing 1 is the positions of the brackets 120 and 121 provided to the upper supporting bars 113 and 114, respectively, a force $F_G$ is applied from the oscillator housing 1 to the positions of the optical resonator as shown in FIG. 10. Meanwhile, inertial forces $F_A$ and $F_B$ are generated in barycentres A and B of the two optical bases 7 and 9 composing the optical resonator. Moments are generated in the optical resonator by these forces $F_G$, $F_A$ and $F_B$, and the structure of the optical resonator is elastically deformed as shown in FIG. 11. As a result, the error of the mirror alignment occurs.

When the orthogonal excitation-type laser oscillator is not installed in a sufficient vibration-proof environment, the force $F_G$ which is generated due to the oscillation exerting upon the oscillator housing 1 and which is applied to the connected points between the oscillator housing 1 and the optical resonator and the inertial forces $F_A$ and $F_B$ which are applied to the barycenter of the optical resonator act to deform the optical resonator remarkably. Such a deformation of the optical resonator, namely, the error of the mirror alignment makes a laser output and a beam mode of a laser beam unstable.

SUMMARY OF THE INVENTION

The present invention has been achieved in order to solve the above problems. It is an object of this invention to provide an orthogonal excitation-type laser oscillator in which an optical resonator composed of a pair of optical bases arranged parallel and supporting bars can keep arrangement positions of the paired optical bases constant regardless of forces to be applied to an oscillator housing due to oscillation.

In the orthogonal excitation-type laser oscillator according to the present invention, one optical base is provided on each side of a housing that houses a laser oscillator. Optical parts of an optical resonator are fixed to the optical bases. The optical bases are fixed to each other, independently from the housing, by supporting rods. First and second connecting members fix the respective optical base to respective end of the housing. The first connecting member bends in the direction of the laser beam when the housing deforms. The second connecting member attenuates oscillation generated due to the displacement of the housing.

These and other objects, features and advantages of the present invention are specifically set forth in or will become apparent from the following detailed descriptions of the invention when read in conjunction with the accompanying drawings.

DETAILED DESCRIPTIONS

Figure 1:
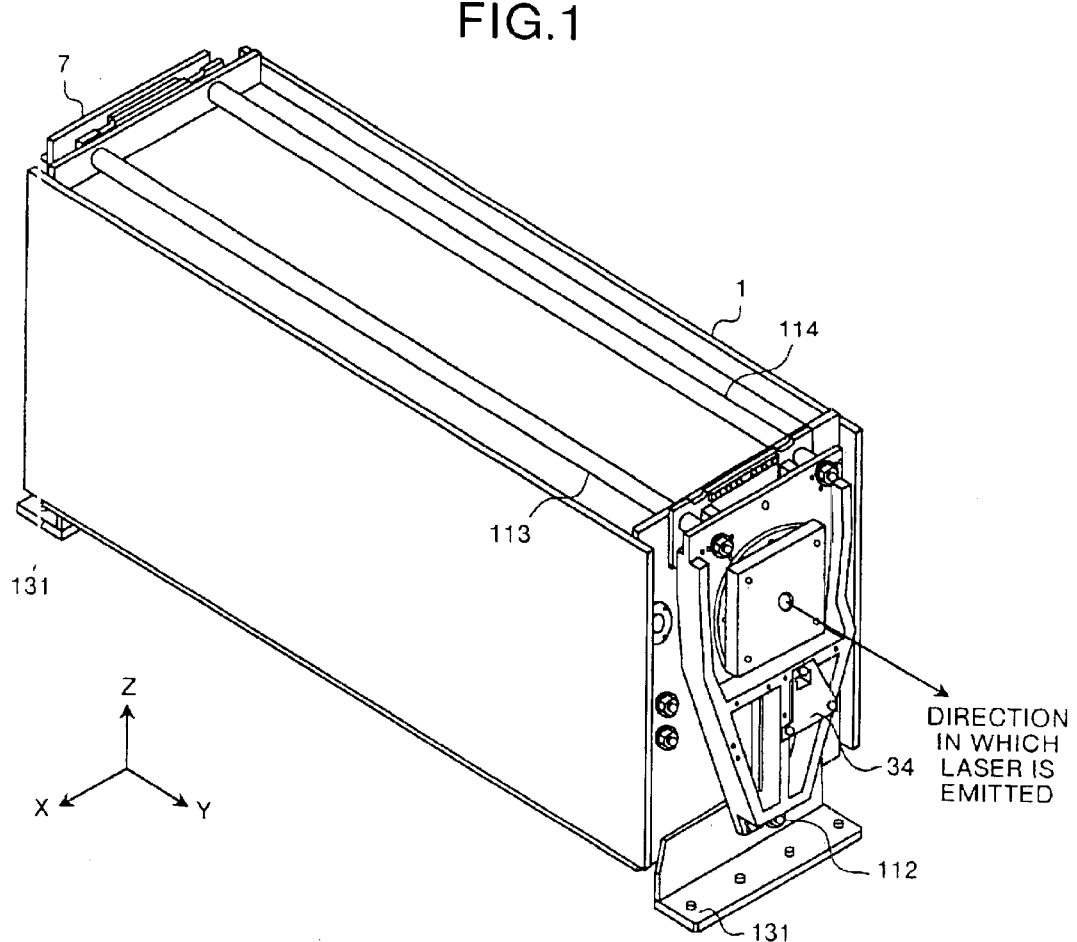
FIG. 1 is a whole perspective view of an orthogonal excitation-type laser oscillator according to a first embodiment of the present invention.

Embodiments of the orthogonal excitation-type laser oscillator according to the present invention will be explained in detail with reference to the attached drawings. Same reference numerals are provided to those components that are same or perform similar functions as in the conventional art.

Figure 2:
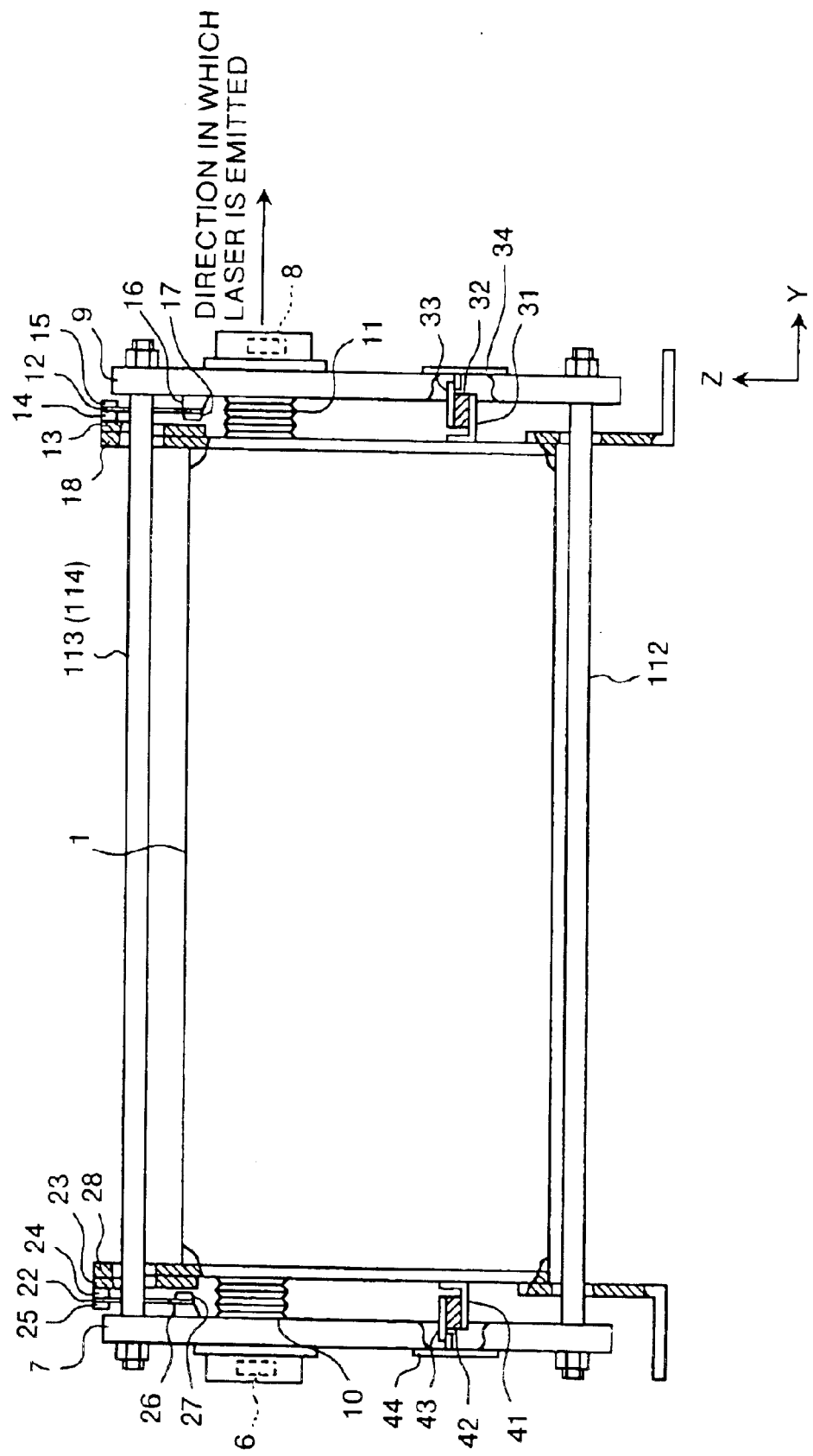
FIG. 2 is a front view of the orthogonal excitation-type laser oscillator according to the first embodiment of the present invention.
Figure 3:
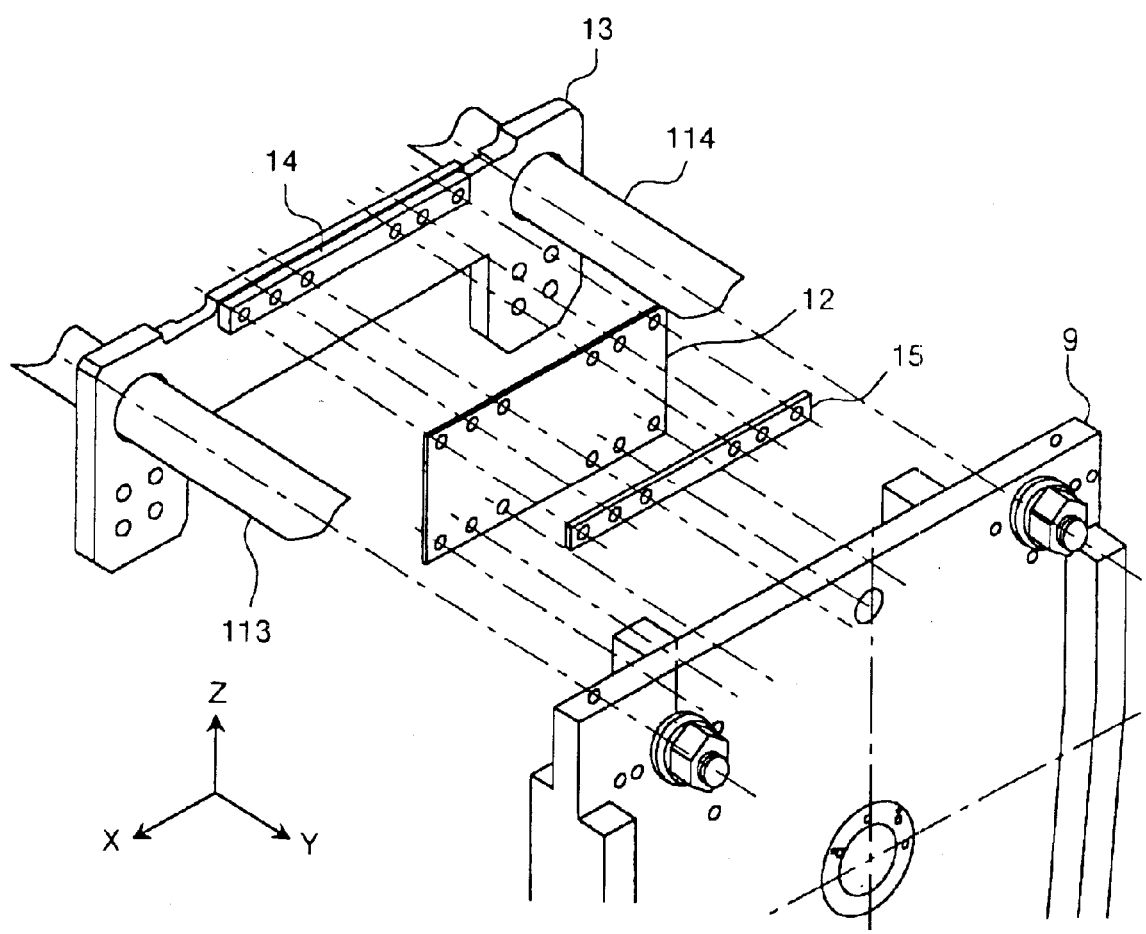
FIG. 3 is a perspective view which shows a state of connection of a first connecting member in the orthogonal excitation-type laser oscillator according to the first embodiment of the present invention.
Figure 4:
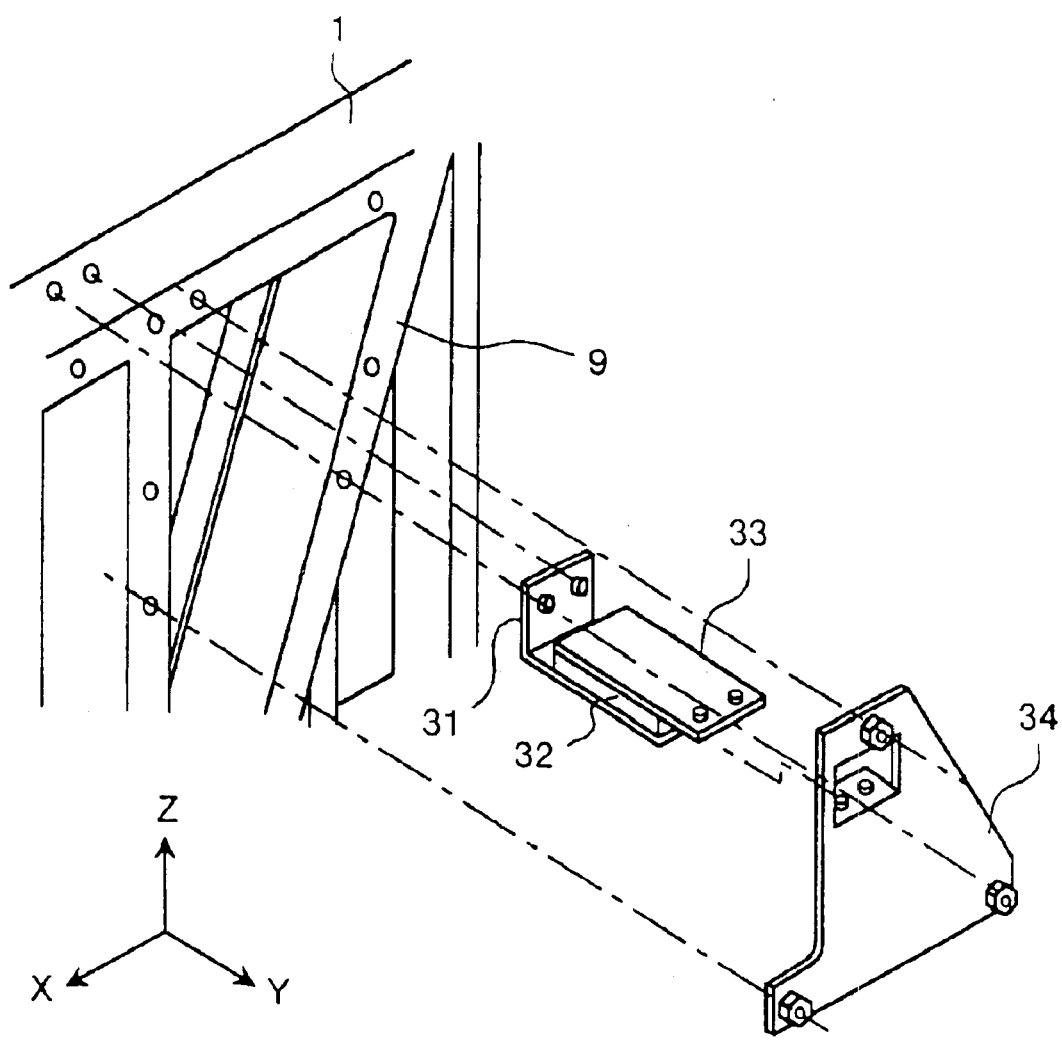
FIG. 4 is a perspective view which shows a state of connection of a second connecting member in the orthogonal excitation-type laser oscillator according to the first embodiment of the present invention.
Figure 5:
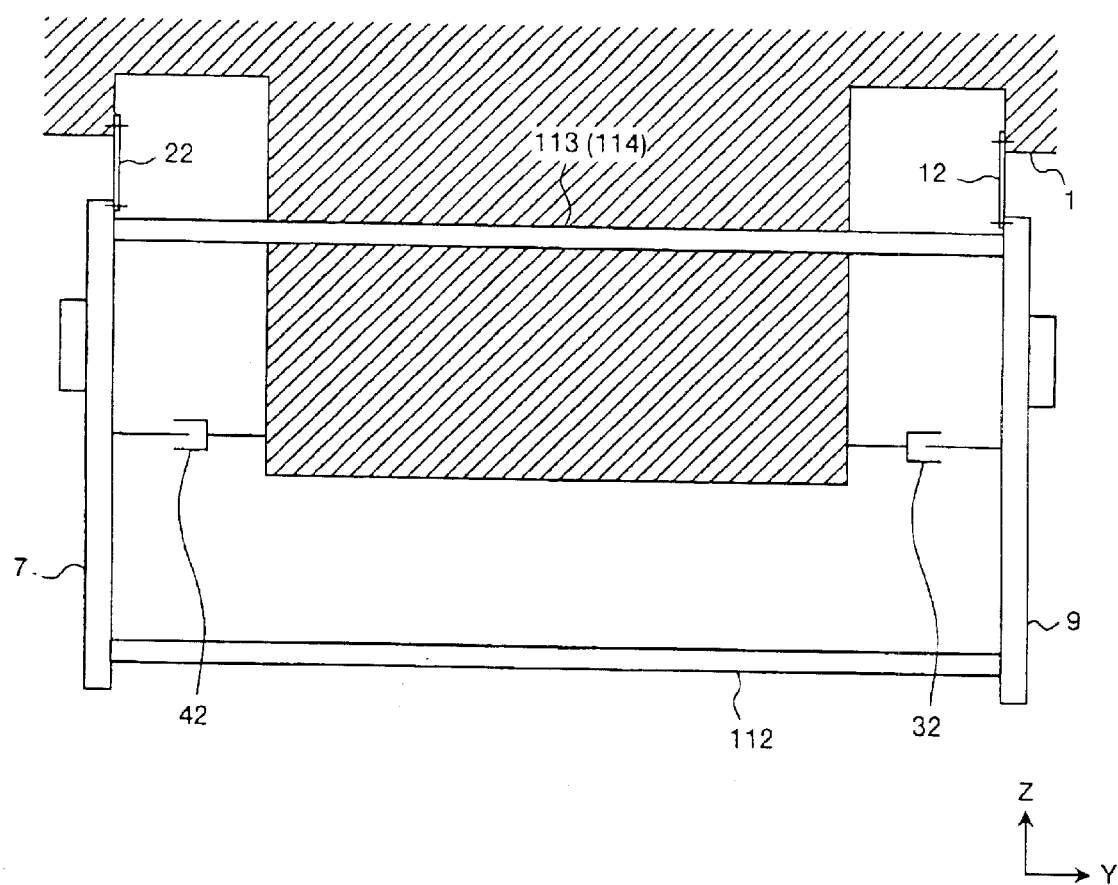
FIG. 5 is a schematic diagram which shows a connected relationship between an oscillator housing and optical bases in the orthogonal excitation-type laser oscillator according to the first embodiment of the present invention.
Figure 6:
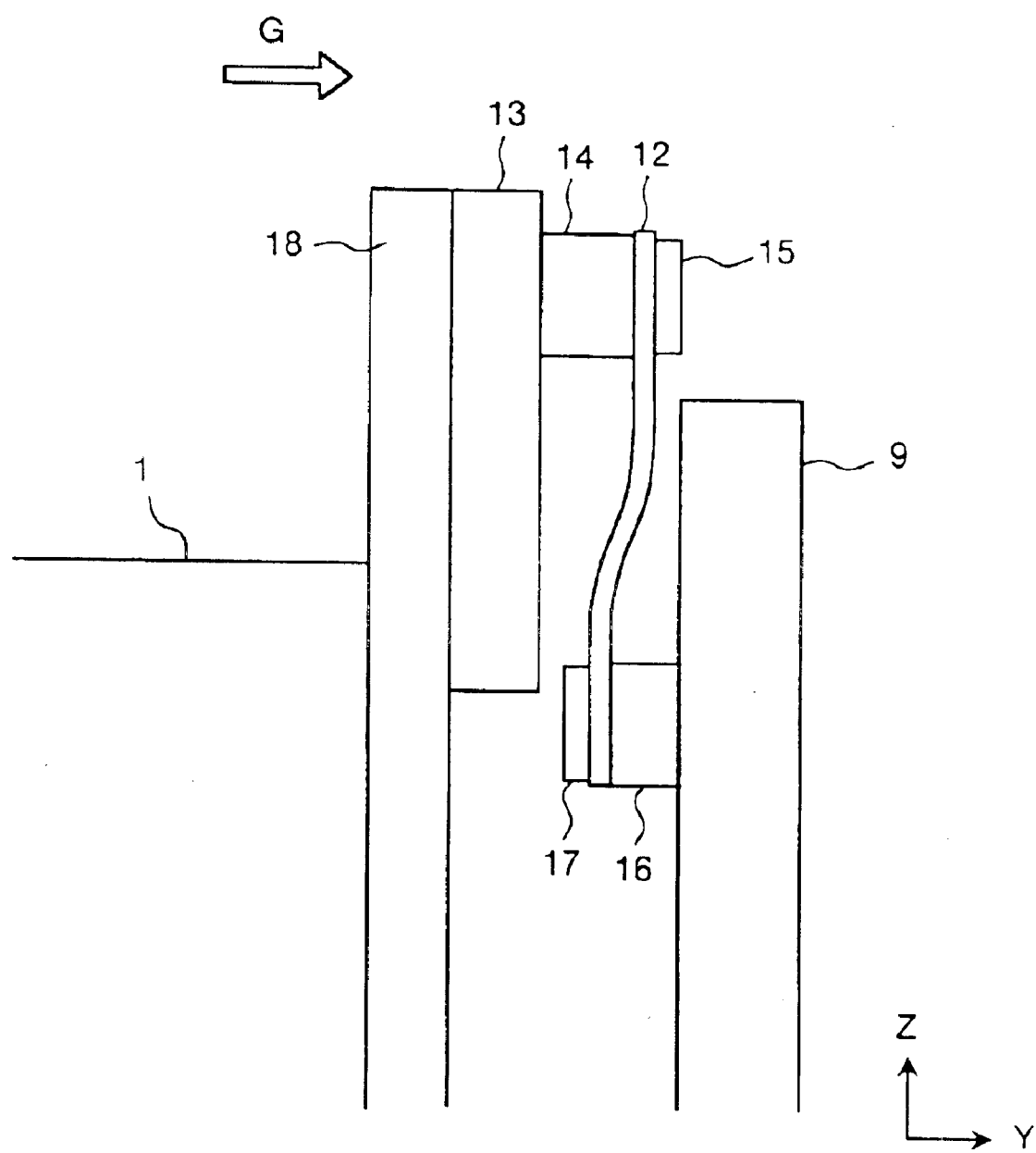
FIG. 6 is a front view which shows a deformation of the first connecting member in an optic axis direction.

FIG. 1 is a perspective of a first embodiment of the orthogonal excitation-type laser oscillator according to the present invention. FIG. 2 is a front view of the orthogonal excitation-type laser oscillator. FIGS. 3 through 5 are schematic diagrams which show concrete structure of this orthogonal excitation-type laser oscillator. FIG. 3 is a diagram which shows a connected state of a first connecting member provided between an oscillator housing and optical bases. FIG. 4 is a diagram which shows a connected state of a second connecting member provided between the oscillator housing and the optical bases. FIG. 5 is a diagram which schematically shows that the oscillator housing and the optical bases are connected by the first and second connecting members. FIG. 6 is a diagram which schematically shows that the first connecting member is deformed in an optic axis direction of a laser beam. In the following explanation, the optic axis direction is the Y axis, a heightwise direction vertical to the optical axis is the Z axis, and a direction vertical to the Y axis and the Z axis is the X axis.

An oscillator housing 1 is filed with a laser medium gas such as $CO_2$, and the oscillator housing 1 is sealed. Although not shown in the drawings, a discharge electrode for generating a laser beam, a heat exchanger which cools the laser medium gas, a blower which circulates the laser medium gas and the like are provided inside the oscillator housing 1. End plates 18 and 28 are provided on both ends of the oscillator housing 1 in the optic axis direction so as to protrude farther than an upper surface of the oscillator housing 1.

A rear optical base 7 which holds a total reflection mirror 6, and a front optical base 9 which holds a partial reflection mirror 8 on the same optical axis as that of the total reflection mirror 6 are arranged on both sides of the oscillator housing 1 in the optic axis direction by one lower supporting bar and two upper supporting bars totaling to three lower supporting bars 112 through 114 so as to be parallel with each other. The rear optical base 7 which holds the total reflection mirror 6 and the front optical base 9 which holds the partial reflection mirror 8 compose an optical resonator. The upper supporting bars 113 and 114 pierce through the end plates 18 and 28 provided on the ends of the oscillator housing 1, respectively, so as to extend to an advancing direction of a laser beam (optic axis direction).

The end plate 28 of the oscillator housing 1 and the rear optical base 7 are connected by bellows 10, a first connecting member 22 and a second connecting member 42. The end plate 18 of the oscillator housing 1 and the front optical base 9 are connected by bellows 11, a first connecting member 12 and a second connecting member 32. The bellows 10 and 11 allow a laser beam to pass through between the partial reflection mirror 8 and the oscillator housing 1 and between the total reflection mirror 6 and the oscillation housing 1, respectively, without aerating the laser beam.

The first connecting member 22 made of a material easily bent in the optic axis direction (Y-axial direction) connects the end plate 28 of the oscillator housing 1 and the rear optical base 7, and the first connecting member 12 made of a material easily bent in the optic axis direction (Y-axial direction) connects the end plate 18 of the oscillator housing 1 and the front optical base 9. Moreover, it is desirable that the first connecting members 12 and 22 have high rigidity in the X-axial direction. As the first connecting members 12 and 22, for example, rectangular plate springs 12 and 22, in which a length in the X-axial direction is longer than a length in the Z-axial direction and a thickness in the Y-axial direction is very much shorter than the lengths in the X-axial direction and Z-axial direction, can be used (see FIGS. 2 and 3). An upper end portion of the plate spring 12 (22) is mounted to an upper end portion of a plate spring supporting plate 13 (23) fixed to the end plate 18 (28) of the oscillator housing 1 in a state that it is sandwiched between a plate spring fitting seat 14 (24) and a plate spring fixing plate 15 (25). Moreover, a lower end portion of the plate spring 12 (22) is fixed in a state that it is sandwiched between a plate spring fitting seat 16 (26) mounted to the optical base 9 (7) and a plate spring fixing plate 17 (27). The endplate 18 (28), the plate spring supporting plate 13 (23), the plate spring fitting seat 14 (24), the plate spring 12 (22) and the plate spring fixing plate 15 (25) are fixed by screwing or the like. Moreover, the optical base 9 (7), the plate spring fitting seat 16 (26), the plate spring 12 (22) and the plate spring fixing plate 17 (27) are also fixed by screwing or the like.

The second connecting member 42 made of a material easily absorbing oscillation connects the end plate 28 of the oscillator housing 1 and the rear optical base 7. The second connecting member 32 made of a material easily absorbing oscillation connects the end plate 18 of the oscillator housing 1 and the front optical base 9. As the second connecting members 42 and 32, a damper such as an acryl viscoelastic material, a silicon viscoelastic material or high-attenuation rubber viscoelastic material can be used (see FIGS. 2 and 4). The damper 32 (42) is sandwiched closely between one plane of an L-shaped lower damper fitting plate 31(41) and an upper damper fitting plate 33 (43) arranged parallel with the plane. A surface of the L-shaped lower damper fitting plate 31(41) which is vertical to an adhered surface to the damper 32 (42) is fixed by the end plate 18 (28) of the oscillator housing 1 and screwing or the like. The upper damper fitting plate 33 (43) is fixed by a damper supporting plate 34 (44) attached to the optical base 9 (7) and screwing or the like.

A mechanism of oscillation suppression when oscillation is generated in the orthogonal excitation-type laser oscillator having the above structure will be explained. As shown in FIG. 5, in the orthogonal excitation-type laser oscillator of the present invention, the optical bases 7 and 9 composing the optical resonator are hung from the oscillator housing 1 by the first connecting members (plate springs) 12 and 22, and the hung optical bases 7 and 9 are practically connected to the oscillator housing 1 by the second connecting members (dampers) 42 and 32 in a horizontal direction.

Namely, as shown in FIG. 6 for example, when the oscillator housing 1 receives the acceleration G in a laser emitting direction, the oscillator housing 1 displaces to the optic axis direction, i.e., the Y-axial direction, but the optical bases 7 and 9 try to remain in the original positions due to the inertial law. The displacement between the oscillator housing 1 and the optical bases 9 and 7 are absorbed by elastic deformation (bending deformation) of the plate springs 12 and 22 to the Y-axial direction. Since reaction forces due to the elastic deformation of the plate springs 12 and 22 are very small, an influence of the deformation to be exerted upon the paired optical bases 7 and 9 composing the optical resonator is normally small enough to be ignorable. Therefore, the positional relationships such as parallelism and axial shift of the paired optical bases 7 and 9 can be kept in the initial state where there is no influence of the acceleration. Moreover, the oscillation of the oscillator housing 1 at the time when the oscillator housing 1 displaced to the Y-axial direction returns to the original position is attenuated and eliminated by cushioning actions of the dampers 32 and 42, namely, allowing the dampers 32 and 42 to generate the reaction forces proportional to a positional change speed of the oscillator housing 1 with respect to the optical bases 7 and 9. Therefore, even when the oscillator housing 1 oscillates, the positional change of the optical resonator with respect to the oscillator housing 1 can be made small. Here, in FIG. 6, for convenience of the explanation, the upper supporting bars 113 and 114 are not shown.

In addition, when the plate springs 12 and 22 having high rigidity in the X-axial direction are used, even when the oscillator housing 1 receives the acceleration to the X-axial direction, the oscillator housing 1 can keep the same state as the initial state where there is no influence of the acceleration.

In the above explanation, it is desirable that the optical bases 7 and 9 and the upper portion of the oscillator housing 1 are connected to each other by the first connecting members (plate springs) 22 and 12 so that center positions of the bellows 10 and 11 on the connection side with the optical bases 7 and 9 restrict a degree of freedom of the X-axial direction (front-rear direction in FIG. 2), the Z-axial direction (heightwise direction) and a rotating direction about the Y-axis (optical axis of a laser beam) with respect to center positions of the bellows 10 and 11 on the connection side with the end plates 28 and 18 of the oscillator housing 1 and the Y-axial direction, a rotating direction about the X axis and a rotating direction about the Z axis are movable. In such a manner, the first connecting members (plate springs) 22 and 12 are connected so that the displacement of oscillator housing 1 and the oscillation due to it can be suppressed, and the axially shift deformation due to the displacement of the bellows 10 and 11 due to the thermal deformation of the oscillator housing 1 is also suppressed. Further, generation of an adverse deforming force to be exerted on the optical bases 7 and 9 can be suppressed.

According to the first embodiment, since the plate springs 12 and 22 as the first connecting members absorb the displacement of the oscillator housing 1 due to oscillation and the deformation is not transmitted to the optical bases 9 and 7, the positional relationship between the two optical bases 9 and 7 can be maintained. Moreover, the dampers 32 and 42 as the second connecting members attenuate the oscillation when the displaced oscillator housing 1 tries to return to the original position, so that the positional change of the optical resonator with respect to the oscillator housing 1 can be made small. As a result, the laser optical axis of a laser beam can be kept constant, and the qualities such as an output and a beam mode of the laser beam can be kept stable.

The first embodiment explains the instance in which, as shown in FIG. 2 or 3, the positions where the plate springs 12 and 22 as the first connecting members are connected to the optical bases 9 and 7, respectively, are fixed to only each one place which is higher than barycentres of the optical bases 9 and 7. In this case, since the reaction forces against the deformation of the plate springs 12 and 22 which are generated due to the displacement of the oscillator housing 1 are very small but not zero, a moment is generated in the optical resonator by the action between the plate springs 12 and 22 and the inertial forces exerted upon the barycenters of the optical bases 9 and 7. This moment acts so as to deform the structure of the optical resonator slightly.

The lower portion of the connecting member (plate spring) 12 (22) may be fixed onto a horizontal line which passes through the barycentres of the optical base 9 (7) by a fixing member. With this constriction, the influence of the moment can be suppressed further. This case will be explained below as a second embodiment.

Figure 7:
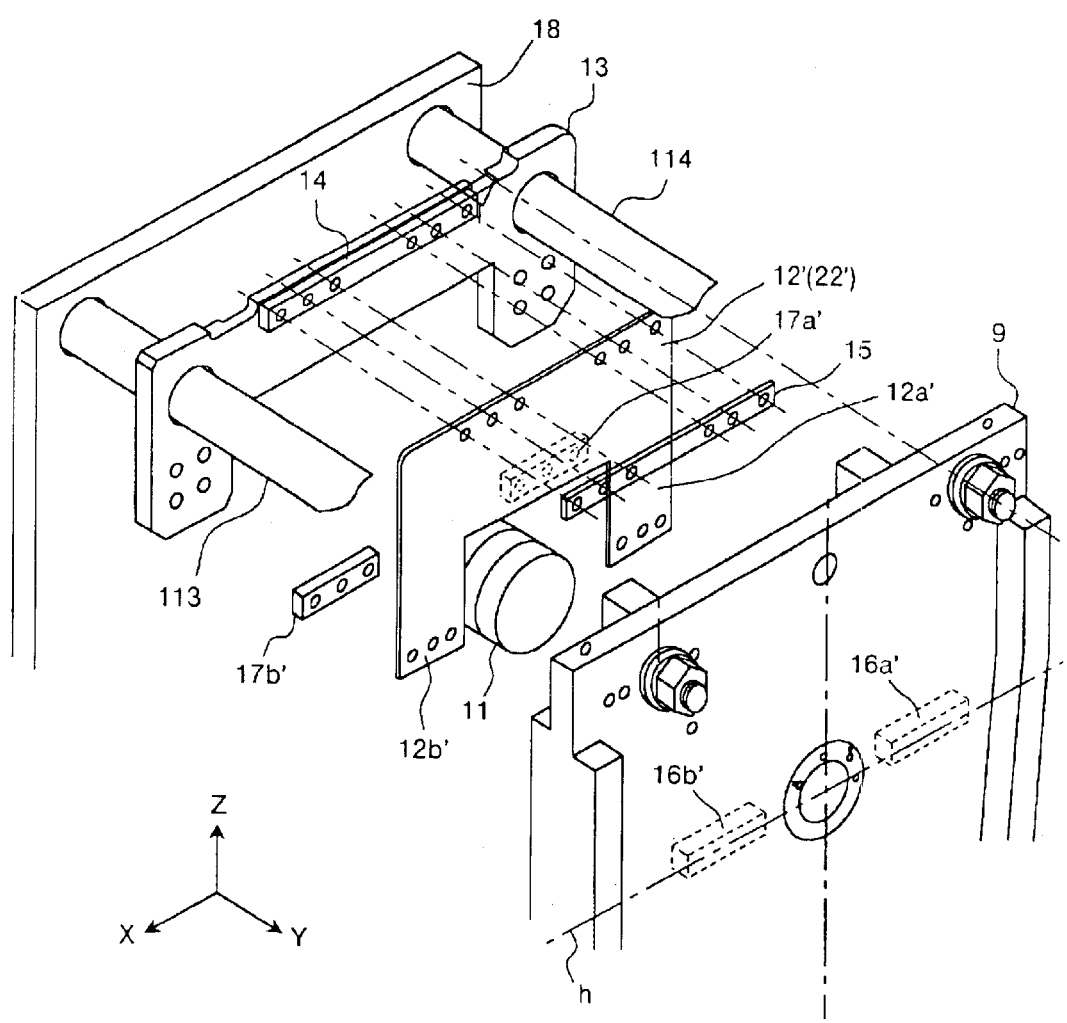
FIG. 7 is a perspective view which shows a state of connection of the first connecting member in the orthogonal excitation-type laser oscillator according to a second embodiment of the present invention.

FIG. 7 is a diagram which shows one example of a connected state between the front optical base 9 and the oscillator housing 1 by means of the first connecting member 12. Here, a concave plate spring 12' is used as the first connecting member 12, and it is designed such that the barycentre of the optical base 9 becomes the center of the bellows 11. The same reference numerals are given to the same components as those in the first embodiment, and the explanation thereof is omitted. Moreover, in FIG. 7, the second connecting member (damper) 32 which is provided slightly below the bellows 11 is not shown, but its connected state is the same as that of the first embodiment.

The concave plate spring 12' is arranged so that leg sections 12a' and 12b' face downward Z-axial direction and that the leg sections 12a' and 12b' sandwich the barycentre of the bellows 11. Namely, on the front optical base 9 side, the upper end portion of the plate spring 12' is attached to the upper end portion of the plate spring supporting plate 13 fixed to the end plate 18 of the oscillator housing 1 by screwing or the like in a state that the upper end portion of the plate spring 12' is sandwiched by the plate spring fitting seat 14 and the plate spring fixing plate 15. The two leg sections 12a' and 12b' of the plate spring 12' are fixed by screwing or the like in a state that the leg sections are sandwiched by plate spring fitting seats 16a' and 16b' attached to the front optical base 9 and plate spring fixing plates 17a' and 17b', respectively. The positions of the leg sections 12a' and 12b' of the plate spring 12', which are fixed by the plate spring fitting seats 16a' and 16b' and the plate spring fixing plates 17a' and 17b', respectively, exist on a horizontal line h which passes through the center position of the bellows 11, namely, the barycentre. The explanation will be omitted, but the concave plate spring is mounted to the rear optical base 7 similarly to the front optical base 9. It is desirable that the positions where the leg sections 12a' and 12b' of the concave plate spring 12' are fixed to the optical base 9 (7) are symmetrical with each other on the horizontal line h passing through the barycentre of the optical base 9 (7) across the barycentre.

A mechanism of the oscillation suppression when oscillation is generated in the orthogonal excitation-type laser oscillator having the above structure will be explained. When the oscillator housing 1 is displaced, similarly to the first embodiment, the concave plate spring 12' is elastically deformed (bent) in the Y-axial direction. A reaction force is generated in the concave plate spring 12' due to the deformation, but since the lower portion of the plate spring 12' is fixed onto the horizontal line passing through the barycentre of the optical base 9 (7), a composite vector of the reaction force of the concave plate spring 12' passes the barycentre of the optical base 9 (7). This reaction force acts to an opposite direction to the direction of the inertial force exerted on the barycenter of the optical base 9 (7). For this reason, even if the reaction force is generated due to the deformation of the concave plate spring 12', it is canceled by the inertial force exerted upon the barycenter of the optical base 9 (7). An adverse moment which deforms the structure of the optical resonator is not generated, or generation of the adverse moment is suppressed so that the deformation of the structure of the optical resonator can be made smaller than that of the first embodiment.

According to the second embodiment, since the connected positions of the first connecting members 12 and 22 on the optical bases 9 and 7 have the same height as that of the barycentres of the optical bases 9 and 7, even when the optical resonator is displaced with respect to the oscillator housing 1 and weak reaction forces are generated in the first connecting members 12 and 22, a composite vector of the reaction forces passes through the barycentres of the optical bases 9 and 7, respectively, so that the reaction forces are canceled by the inertial forces generated in the optical bases 9 and 7. Moreover, a force which deforms the structure of the optical resonator can be suppressed. As a result, qualities such as the output and the beam mode of a laser beam can be kept stable.

The first embodiment explains the instance in which the dampers 32 and 42 as the second connecting members are arranged between the end portion of the oscillator housing 1 in the optic axis direction and the optical bases 9 and 7, respectively, and the arranged positions are shifted from the barycentres of the optical bases 9 and 7, as shown in FIGS. 2 or 4. In the orthogonal excitation-type laser oscillator having such a structure, the moment is generated by the actions of the reaction forces of the dampers 32 and 42, which are generated when the positional change between the optical bases 9 and 7 and the oscillation housing 1 occurs, and of the inertial forces exerted on the barycenters of the optical bases 9 and 7. This moment acts so as to deform the structure of the optical resonator slightly.

Two dampers may be arranged between the end faces of the oscillator housing 1 in the optic axis direction and the optical bases 9 and 7, respectively, and the dampers 32 and 42 are arranged on both sides of the optical bases 9 and 7 on the horizontal lines passing through their barycentres across the barycentres, respectively. This case will be explained below as a third embodiment.

Figure 8:
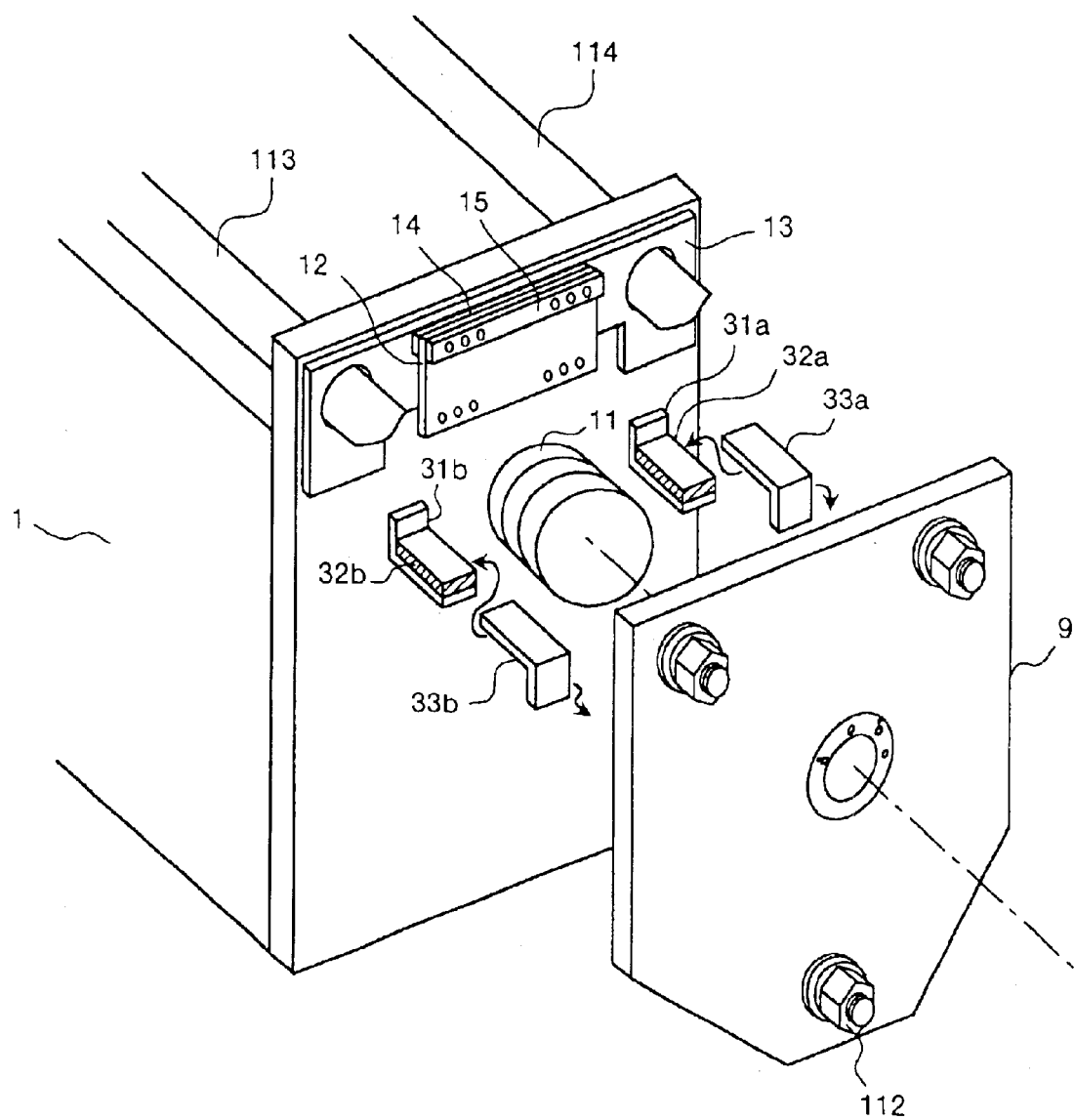
FIG. 8 is a perspective view which shows a state of connection of the second connecting member in the orthogonal excitation-type laser oscillator according to a third embodiment of the present invention.
Figure 9:
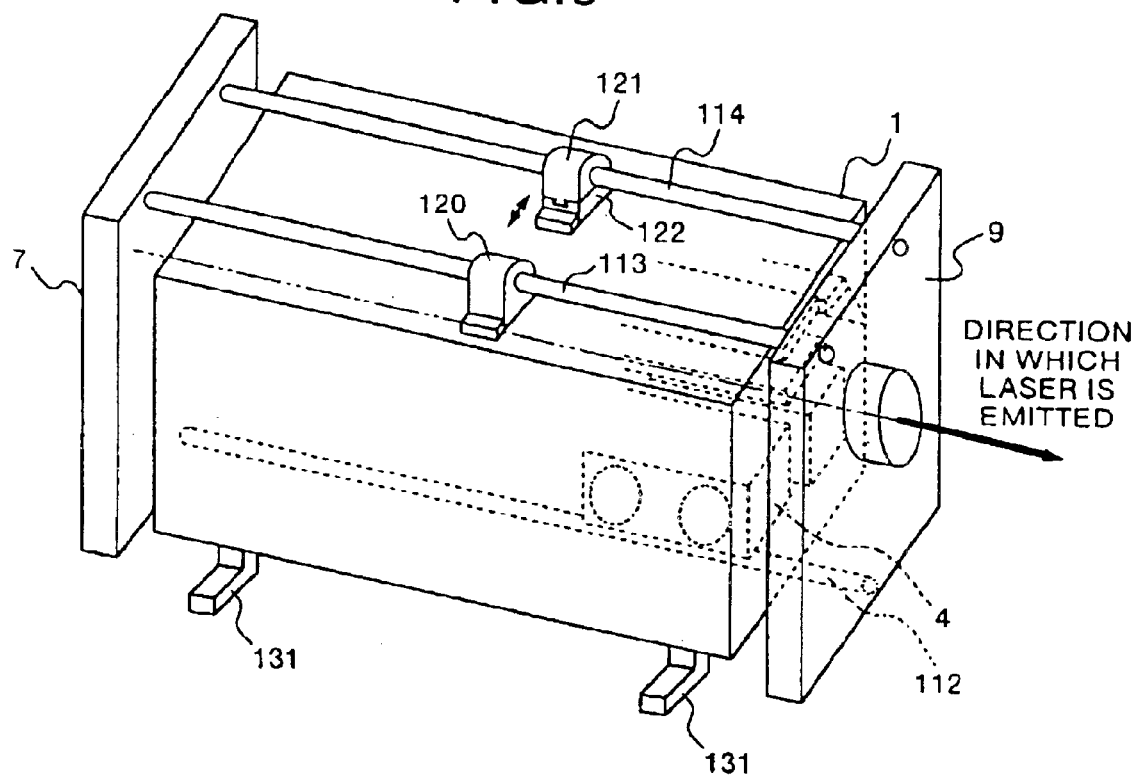
FIG. 9 is a perspective view which shows a conventional example of the orthogonal excitation-type laser oscillator.
Figure 10:
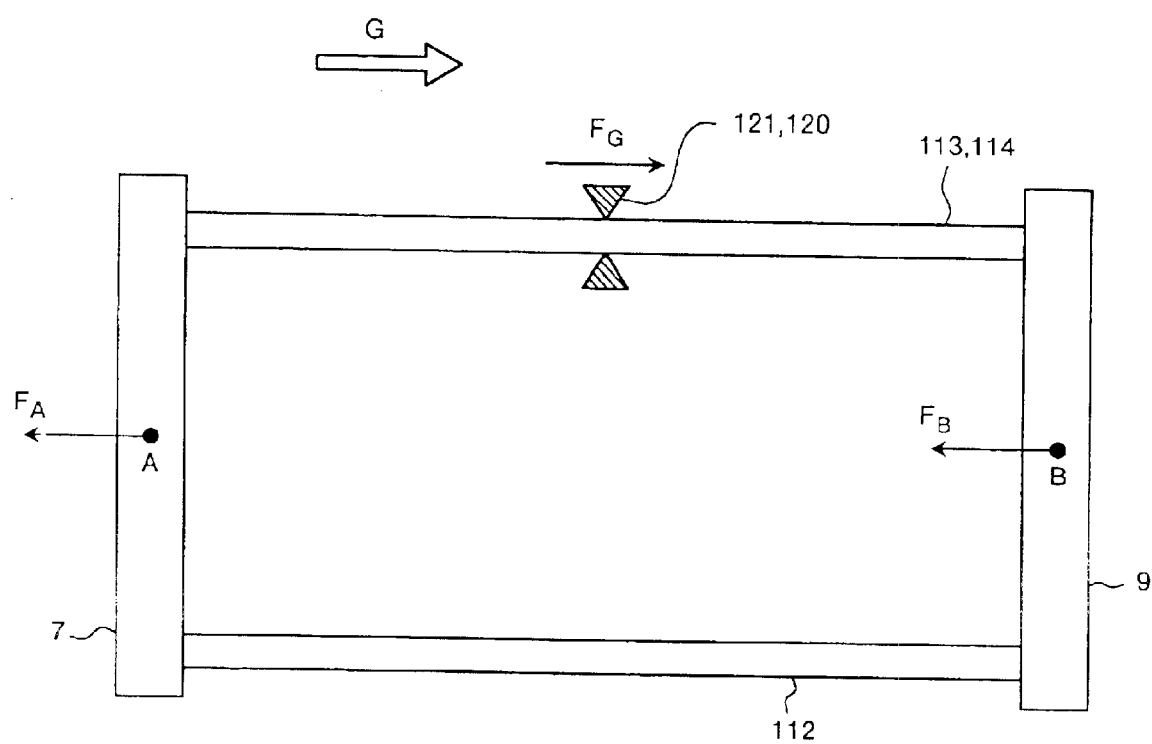
FIG. 10 is a diagram which schematically shows forces to be applied to the optical resonator when acceleration is applied to the conventional orthogonal excitation-type laser oscillator.
Figure 11:
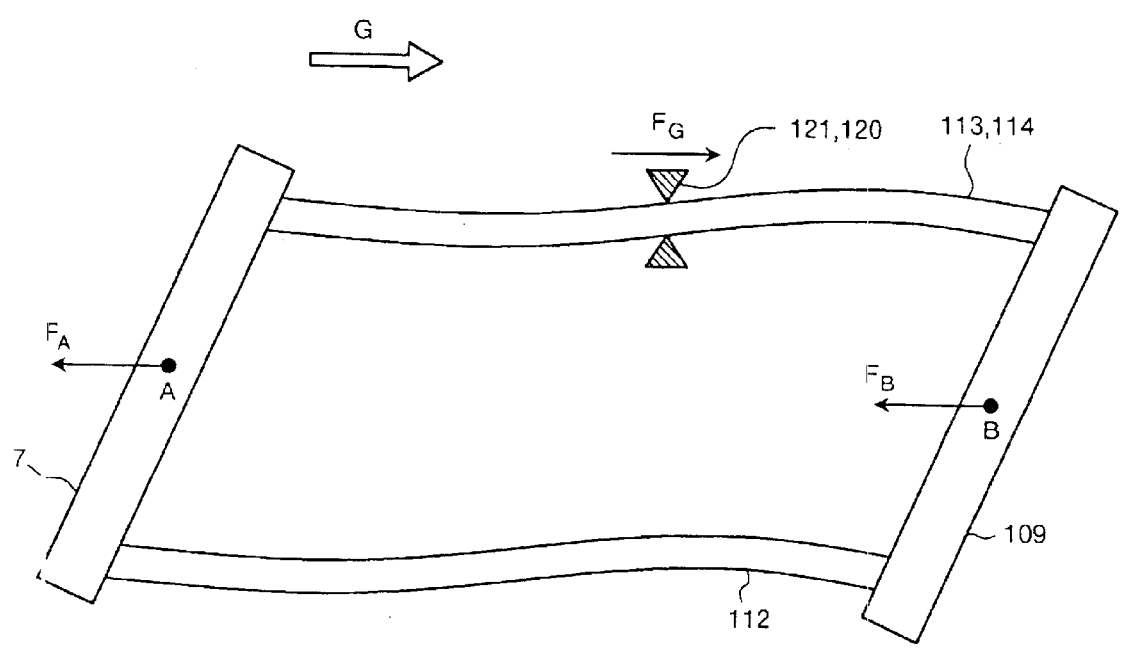
FIG. 11 is a diagram which schematically shows a state of deformation of the optical resonator due to forces to be applied to an optical resonator.

FIG. 8 is a diagram which shows one example of the connected state between the optical base 9 and the oscillator housing 1 by means of the second connecting member 32 according to the third embodiment. Two dampers 32a and 32b are used as the second connecting members, and a design is made so that the barycenter of the optical base 9 is the center of the bellows 11. The same reference numerals are given to the same components as those in the first embodiment, and the explanation thereof is omitted.

Dampers 32a and 32b are arranged on a horizontal line h passing through the barycenter of the bellows 11 in the plane of the optical base 9 on the bellows 11 side so as to be symmetrical with each other with respect to the barycentre of the bellows 11. The damper 32a is constituted so as to be sandwiched closely between an L-shaped lower damper fitting plate 31a and an L-shaped upper damper fitting plate 33a. Moreover, a surface which is vertical to the fitting surface of the lower damper fitting plate 31a with the damper 32a is fixed by the end plate 18 of the oscillator housing 1 and a fixing member such as a screw, and a surface which is vertical to the fitting surface of the upper damper fitting plate 33a with the damper 32a is fixed by the optical base 9 and a fixing member such as a screw. Similarly, the damper 32b is also sandwiched closely between an L-shaped lower damper fitting plate 31b and an L-shaped upper damper fitting plate 33b. A surface which is vertical to the fitting surface of the lower damper fitting plate 31b with the damper 32b is fixed by the end plate 18 of the oscillator housing 1 and a fixing member such as a screw, and a surface which is vertical to the fitting surface of the upper damper fitting plate 33b with the damper 32b is fixed by the optical base 9 and a fixing member such as a screw.

A mechanism of oscillation suppression when oscillation is generated in the orthogonal excitation-type laser oscillator having such a structure will be explained. When displacement to the optic axis direction, namely, the Y-axial direction occurs in the oscillator housing 1, the plate spring 12 is elastically deformed (bent) to the Y-axial direction similarly to that in the first embodiment. Although the displaced oscillator housing 1 tries to return to the original position, reaction forces are generated in the dampers 32a and 32b due to the positional change between the optical base 9 and the oscillator housing 1. However, since the dampers 32a and 32b are fixed onto the horizontal line passing through the barycentre of the optical base 9, a composite vector of the reaction forces generated in the dampers 32a and 32b passes through the barycentre of the optical base 9. The composite vector of the reaction forces acts in the opposite direction to the direction of the inertial force applied to the barycentre of the optical base 9. For this reason, even if the reaction forces are generated in the dampers 32a and 32b, they are canceled by the inertial force applied to the barycenter of the optical base 9 so that an adverse moment which deforms the structure of the optical resonator is not generated or generation of an adverse moment is suppressed, and thus the deformation of the structure of the optical resonator can be made smaller.

According to the third embodiment, since the connected positions of the second connecting members 32 and 42 between the side end surfaces of the oscillator housing 1 and the optical bases 9 and 7 have the same height as that of the barycentres of the optical bases 9 and 7, even if the positional change of the optical resonator with respect to the oscillator housing 1 occurs and the reaction forces which are proportional to a speed of the positional change are generated in the dampers 32 and 42 as the second connecting members, the composite vector of the reaction forces passes through the barycentres of the optical bases 9 and 7 and are canceled by the inertial forces generated in the optical bases 9 and 7, so that a force which deforms the structure of the optical resonator can be suppressed. As a result, the qualities such as the output and beam mode of a laser beam can be kept stable.

The structures of the second and third embodiments may be combined. Namely, the connected places of the first connecting members 12 and 22 with the optical bases 9 and 7 have the same height as that of the barycentres of the optical bases 9 and 7, and the connected places of the second connecting members 32 and 42 also have the same height as that of the barycentres of the optical bases 9 and 7. As a result, even when the positional change of the optical resonator with respect to the oscillator housing 1 occurs and the reaction forces are generated in the first connecting members 12 and 22, the composite vectors of the reaction forces pass through the barycentres of the optical bases 9 and 7, respectively, so as to be canceled by the inertial forces generated in the optical bases 9 and 7. For this reason, the force which deforms the optical resonator can be suppressed. Moreover, even when the reaction forces which are proportional to the speed of the positional change are generated in the second connecting members due to the positional change of the optical resonator with respect to the oscillator housing 1, the composite vector of the reaction forces passes through the barycentres of the optical bases 9 and 7 so as to be canceled by the inertial forces generated in the optical bases 9 and 7. As a result, the force which deforms the optical resonator can be suppressed.

In addition, the above explanation exemplifies the instance in which the three supporting bars 112 through 114 support the optical bases 7 and 9, but a number of the bars is not limited to three, and four or more supporting bars may support the optical bases 7 and 9.

As explained above, according to one aspect of the present invention, since the side end portion of the oscillator housing and the optical bases are connected by the first connecting members which absorb displacement of the oscillator housing to the optic axis direction by means of a bending movement to the optic axis direction and the second connecting members which attenuate oscillation generated due to the displacement of the oscillator housing, there is an effect that even if displacement of the oscillator housing in a horizontal plane and oscillation due to this occur, a force which deforms the structure of the optical resonator can be suppressed and the positional relationships such as parallelism and axial shift of the paired optical bases can be maintained in the initial state. As a result, there is an effect that the qualities such as the output and beam mode of a laser beam can be kept stable.

Moreover, since the connected positions between the first connecting members and the optical bases have the same height as that of the barycentres of the optical bases, there is an effect that even if slight reaction forces are generated in the first connecting members due to the positional change of the optical resonator with respect to the oscillator housing, the composite vectors of the reaction forces pass through the barycentres of the optical bases, respectively, so as to be canceled by the inertial forces generated in the optical bases and a force which deforms the structure of the optical resonator can be suppressed. As a result, there is an effect that the qualities such as the output and beam mode of a laser beam can be kept stable.

Furthermore, since the connected positions of the second connecting members with the optical bases are on the horizontal lines passing through the barycentres of the optical bases and are symmetrical with respect to the barycentres, there is an effect that even if the reaction forces are generated in the second connecting members due to oscillation of the oscillator housing, the composite vectors of the reaction forces pass through the barycentres of the optical bases, respectively, so as to be canceled by the inertial forces generated in the optical bases and the force which deforms the structure of the optical resonator can be suppressed. As a result, there is an effect that the qualities such as the output and beam mode of a laser beam can be kept constant.

Moreover, since the plate springs are used as the first connecting members, there is an effect that displacement of the oscillation housing in the optic axis direction can be absorbed effectively.

Furthermore, since the concave plate springs are used as the plate springs, there is an effect that the connected positions of the first connecting members with the optical bases can have the same height as that of the barycenters of the optical bases.

Moreover, since the dampers are used as the second connecting members, there is an effect that the oscillation of the oscillator housing is attenuated effectively and transmission of the oscillation to the optical resonator can be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An orthogonal excitation-type laser oscillator comprising:

a housing that houses a laser oscillator;

one optical base provided on each side of the housing that is perpendicular to the direction of the laser beam generated by the laser oscillator, the optical bases supporting optical parts of an optical resonator;

at least three supporting bars that are parallel to the direction of the laser beam and support the optical bases independently with respect to the housing;

one bellows for connecting respective optical base to the respective end of the housing;

a first connecting member for connecting respective optical base to respective end of the housing, the first connecting member absorbs displacement of the housing in the direction of the laser beam by bending in the direction of the laser beam; and a second connecting member for connecting respective optical base to respective end of the housing, the second connecting member attenuates oscillation generated due to the displacement of the housing.

2. The orthogonal excitation-type laser oscillator according to claim 1, wherein there is one first connecting member and the first connecting member is connected to the optical base at least at two points that lay on a horizontal line which passes through a barycentre of the optical base.

3. The orthogonal excitation-type laser oscillator according to claim 1, wherein there are two second connecting members and each second connecting member is connected to the optical base at a point that lay on a horizontal line which passes through a barycentre of the optical base.

4. The orthogonal excitation-type laser oscillator according to claim 1, wherein the first connecting member is a plate spring.

5. The orthogonal excitation-type laser oscillator according to claim 4, wherein the plate spring has a concave shape.

6. The orthogonal excitation-type laser oscillator according to claim 1, wherein the second connecting member is a damper.

* * * * *